Dec. 9, 1930.  K. HAUSSMANN  1,784,354

DRIVE FOR MOTOR BOATS

Filed Oct. 2, 1928

Inventor
Karl Haussmann
By Knight Bro
attys

Patented Dec. 9, 1930

1,784,354

UNITED STATES PATENT OFFICE

KARL HAUSSMANN, OF KIEL, GERMANY, ASSIGNOR TO FRIED. KRUPP GERMANIA-WERFT AKTIENGESELLSCHAFT, OF KIEL-GAARDEN, PRUSSIA, GERMANY

DRIVE FOR MOTOR BOATS

Application filed October 2, 1928, Serial No. 309,880, and in Germany November 28, 1927.

The invention relates to the drive of motor boats and has more particularly reference to drives which are fitted with a reversing gear, to obtain the ahead and astern run, and with a transmission gear adapted to reduce the rate of revolutions when high speed motors are used.

In the known motor boat drives of this type the reduction of the rate of revolutions is made by means of a separate wheel gear. This arrangement, however, results in a considerable increase of the overall length of the drive, which length is already rather a great one, and further in a notable increase of weight.

Now the invention has for its object to produce a motor boat drive that overcomes these drawbacks. This object is obtained according to the invention by the fact that the reversing gear is at the same time designed to form a reduction gear and that the combined reversing and reduction gear is so connected to a friction clutch arranged between it and the motor that the clutch, the gear brake, and the combined gear can be operated by operating one single lever.

Figure 1:
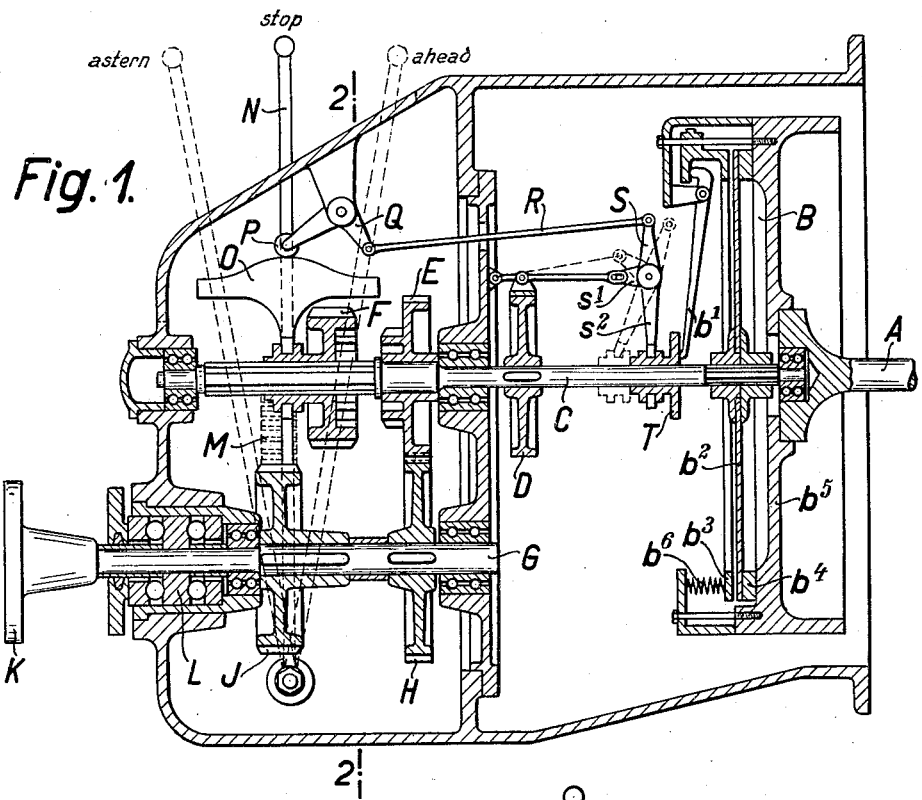
Figure 2:
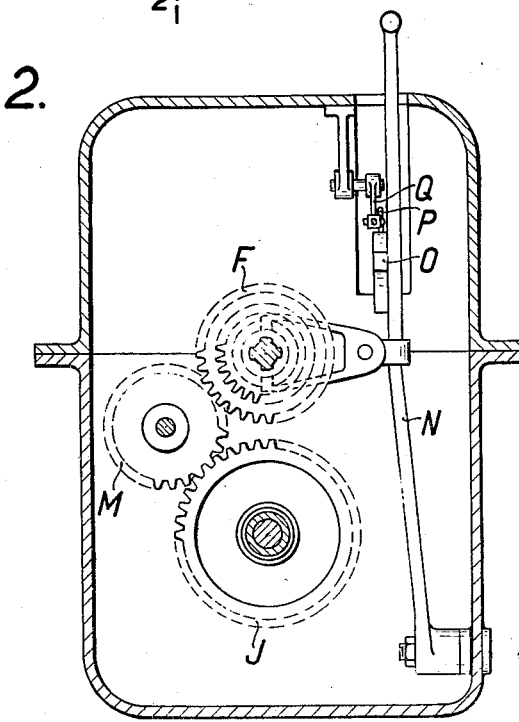

In order to allow the invention to be more easily understood, a preferred embodiment of same is illustrated by way of example in the drawing that accompanies and forms part of this specification. In this drawing Figure 1 shows the drive in a longitudinal vertical section, while Figure 2 is a sectional view on line 2—2 of Figure 1, seen from the right.

Referring to these figures, A denotes the motor shaft and B a clutch adapted to connect it to the upper gear shaft C which carries a brake disk D and spur wheels E and F. The spur wheel E comprises a large and a small rim of teeth, as shown in Figure 1, and is loose on shaft C, whilst the spur wheel F that possesses an outer toothed rim and an internal one corresponding to the small rim of wheel E, is shiftably splined on shaft C. The lower gear shaft G, the main bearing L of which is arranged on the gear casing, as shown, carries a coupling flange K to connect it to the propeller shaft, and has rigidly mounted on it two spur wheels H and J. The former is permanently in mesh with the great rim of the above-mentioned spur wheel E, whilst wheel J is in mesh with a spur wheel M mounted on an intermediate shaft (not shown in Figure 1). By rocking the operating lever N into the position "ahead" and "astern" the spur wheel F is shifted so as to engage, respectively, the loose wheel E or the spur wheel M. The spur wheel F is shifted on shaft C by the operating lever N which engages by means of a piece O fixed thereon a groove provided in the extended hub, of wheel F. The upper edge of piece O forms a cam on which runs a roller P if lever N is rocked. The up and down motions of roller P are transmitted through a bell-crank lever Q journalled in the gear casing, and a rod R to a three-armed lever S, $S^1$, $S^2$, likewise journalled on the casing. Arm $s^1$ actuates the disk brake D, while arm $s^2$ serves to operate the clutch B through the intermediary of a sleeve T shiftable on shaft C, and of levers $b^1$ journalled on the periphery of the half $b^5$ of clutch B (one single lever $b^1$ being shown in Figure 1). The clutch B is designed as a one-disk friction clutch and has the following construction. A steel disk $b^2$ rigidly mounted on the gear shaft C, forms one clutch half of clutch B and may freely rotate between two annular coupling jaws $b^3$, $b^4$ of the other clutch half $b^5$ rigid on the motor shaft A. The engaging friction is produced by compression springs $b^6$ arranged on the periphery of the jaws $b^3$ and the turning moment transmitted in this manner from shaft A to shaft C. The disengagement of the clutch is obtained by rocking the levers $b^1$ that lift the annular jaws $b^3$ from the disk $b^2$ against the action of the springs $b^6$.

In the drawing the gear is illustrated in the "stop" position of the operating lever N. In this position the clutch B is disconnected and the brake D in operative position. The spur wheel F is in mesh neither with wheel M nor with wheel E. Upon moving the operating lever N from "stop" to "ahead" or "astern" the rocking motion which roller P executes on the cam O is transmitted to the brake D always in the releasing sense and to the clutch B in the connecting direction.

More particularly, the arrangement is such as to have always first the respective spur wheel gear engaged, thereupon the brake D released and only then the clutch B thrown in. Inversely, upon rocking the operating lever N from "ahead" or "astern" to "stop," the clutch B is released first, then the brake D is applied and only then the respective wheel gear is disconnected.

The positions of the operating lever N corresponding to "ahead" and "astern" are indicated in the drawing by dash lines. When lever N is in the position "ahead," the internal teeth of wheel F are in mesh with the small rim of wheel E. In this position the turning moment transmitted to shaft C through the clutch B is transmitted to shaft G through the wheels F, E, and H, the direction of rotation of shaft G being opposite to that of the motor shaft A. Upon the operating lever N being in the position "astern," the outer rim of wheel F is coupled with wheel M, the turning moment thus being transmitted to shaft G through the wheels M and J in the direction of rotation of the motor shaft A.

The ratios of transmission of the wheel gears are so chosen that in every direction of rotation the propeller shaft G rotates at a lower rate than the motor shaft A.

In comparison with the known constructions comprising a separate wheel gear, the gear according to the invention has a lower weight but affords the same reliability of service and has a considerably reduced structural length. By exchanging the spur wheels any practically admissible ratio of transmission between the motor shaft and the propeller shaft may be established.

What I claim and desire to secure by Letters Patent, is:—

1. In a device of the character described, a driving shaft, a driven shaft, a reversing gearing intermediate said shafts, a clutch and a separate brake intermediate one of said shafts and said gearing, said gearing having control means for shifting it from one rotating direction to the other over a neutral position, a cam connected to said control means, transmitting means actuated by said cam, a rocking lever connected to said transmitting means, means connecting said lever to said clutch, separate means connecting said lever to said brake, said cam actuating said brake and said clutch in a definite sequence if moved out of its neutral position.

2. In a device of the character described, a driving shaft, a driven shaft, a reversing gearing intermediate said shaft, a clutch and a brake intermediate one of said shafts and said gearing, said gearing having control means for shifting it from one rotating direction to the other over a neutral position, a cam connected to said control means, a transmitting lever having a roller running on said cam and actuating said transmitting lever, a rocking lever actuated by said transmitting lever and connected to said brake and said clutch, said cam operating first said brake and then said clutch if the control means is moved out of its neutral position.

3. In a device of the character described, a driving shaft, a driven shaft, a reversing gearing intermediate said shafts, a clutch and a brake intermediate one of said shafts and said gearing, said gearing having control means for shifting it from one rotating direction to the other over a neutral position, a shiftable cam connected to said control means, a bell crank having on one arm a roller running on said cam, a T-shaped rocking lever, the three arms of said lever being respectively connected to the other arm of said bell crank, said brake and said clutch, said cam being shaped to operate first the brake and then the clutch when it is moved out of neutral position.

4. In a device of the character described, a driving shaft, a driven shaft, a reversing gearing intermediate said shafts, a clutch and a separate brake intermediate one of said shafts in said gearing, control means for shifting said gearing over a neutral position, a cam connected to said control means, a single operating means actuated by said cam, means connecting said operating means to said clutch and separate means connecting said operating means to said brake, said brake being opened and said clutch subsequently thrown in if said control means with said cam are moved from neutral position into one of the operating positions.

The foregoing specification signed at Hamburg, Germany, this twelfth day of September, 1928.

KARL HAUSSMANN.